United States Patent
Ahmed et al.

(10) Patent No.: US 9,967,715 B2
(45) Date of Patent: May 8, 2018

(54) DETERMINING LOCATION OF A USER DEVICE

(71) Applicant: Tata Consultancy Services Limited, Mumbai (IN)

(72) Inventors: Nasimuddin Ahmed, Kolkata (IN); Avik Ghose, Kolkata (IN); Tapas Chakravarty, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days. days.

(21) Appl. No.: 15/200,781

(22) Filed: Jul. 1, 2016

(65) Prior Publication Data

US 2017/0006436 A1    Jan. 5, 2017

(30) Foreign Application Priority Data

Jul. 2, 2015   (IN) .......................... 2540/MUM/2015

(51) Int. Cl.
*H04W 4/04* (2009.01)
*H04W 4/02* (2009.01)
*G01S 5/02* (2010.01)

(52) U.S. Cl.
CPC ........... *H04W 4/043* (2013.01); *G01S 5/0252* (2013.01); *H04W 4/021* (2013.01)

(58) Field of Classification Search
CPC ...... G01S 5/0252; H04W 4/021; H04W 4/043
See application file for complete search history.

(56) References Cited

U.S. PATENT DOCUMENTS

| 8,077,090 B1* | 12/2011 | Chintalapudi | .......... G01S 11/06 342/450 |
| 8,669,902 B2* | 3/2014 | Pandey | .................. G01S 5/021 342/465 |

(Continued)

FOREIGN PATENT DOCUMENTS

| WO | WO 2011065784 A2 | 6/2011 |
| WO | WO 2014074637 A1 | 5/2014 |

OTHER PUBLICATIONS

Tian et al.; "Towards Ubiquitous Indoor Localization Services Leveraging Enviromental Physical Features", IEEE INFOCOM 2014—IEEE Conference on Computer Communications, pp. 55-63, 2014   http://ceca.pku.edu.on/media/lw/82e9d226b30e57d666a63cb7770acf13.pdf.

(Continued)

*Primary Examiner* — Babar Sarwar
(74) *Attorney, Agent, or Firm* — Finnegan, Henderson, Farabow, Garrett & Dunner LLP (57) ABSTRACT

Method(s) and System(s) for determining location of a user device within a premise are described. The method includes identifying multiple zones with physical boundaries within the premise based on parameters associated with geometry of the premise. The premise includes multiple access points distributed across the multiple zones. Thereafter, the method includes collecting a first set of Received Signal Strength Indicator (RSSI) Data that is representative of strength of signals received from each accessible access point, at different locations within the premise. After collecting the first set, the method includes computing a Variable Path Loss Exponent (VPLE) within each zone for each accessible access point for determining location of the user device based on at least one of the first set of RSSI data, a line of (Continued)

sight condition, a non-line of sight condition and distance between each accessible access point from each location.

13 Claims, 4 Drawing Sheets

(56) References Cited

U.S. PATENT DOCUMENTS

| | | | |
|---|---|---|---|
| 2008/0153507 A1* | 6/2008 | Taaghol | H04W 64/00 455/456.1 |
| 2011/0158118 A1* | 6/2011 | Chou | H04L 27/2601 370/252 |
| 2012/0309413 A1* | 12/2012 | Grosman | H04W 64/006 455/456.1 |
| 2013/0023283 A1* | 1/2013 | Chakravarty | G01S 5/0252 455/456.1 |
| 2013/0300607 A1* | 11/2013 | Mansour | G01S 5/0252 342/451 |
| 2014/0064112 A1* | 3/2014 | Das | G01S 5/0252 370/252 |
| 2015/0131483 A1* | 5/2015 | Colban | H04W 48/16 370/254 |
| 2015/0257014 A1* | 9/2015 | Ahmed | H04W 4/04 370/255 |
| 2016/0323717 A1* | 11/2016 | Friday | H04W 4/043 |
| 2016/0337047 A1* | 11/2016 | Khoshnevisan | H04B 17/318 |
| 2017/0180938 A1* | 6/2017 | Smith | H04W 4/023 |

OTHER PUBLICATIONS

Wang et al., No Need to War-Drive: Unsupervised Indoor Localization. Proceedings of the 10th International conference on Mobile systems, applications, and services, ACM, pp. 197-210, 2012 http://www.cse.buffalo.edu/~lusu/cse721/papers/No%20Need%20to%20War-Drive%20Unsuoervised%20Indoor%20Localization.pdf.
Tsui et al.; "Unsupervised Learning for Solving RSS Hardware Variance Problem in WiFi Localization", Mobile Networks and Applications, ACM, pp. 677-691, 2009 http://mll.csie.ntu.edu.tw/papers/UnsupervisedLearningForSolvingRSSHardwareVarianceProblem-InWiFiLocalization.pdf.

* cited by examiner

DETERMINING LOCATION OF A USER DEVICE

PRIORITY CLAIM

This U.S. patent application claims priority under 35 U.S.C. § 119 to: India Application No. 2540/MUM/2015, filed on 2 Jul. 2015. The entire contents of the aforementioned application are incorporated herein by reference.

TECHNICAL FIELD

The present subject matter relates in general, to location determination, in particular, to determining location of the user device in an indoor environment.

BACKGROUND

Generally, location of a user device is computed based on known techniques such as trilateration and triangulation. The techniques usually determine distance of the user device from three or more signal sources to determine regions within each signal source in which the user device is located. The signal sources can be, for instance, GPS satellites, mobile signal towers, and Wi-Fi access points. The location of the user device is then determined based on portion of the regions that overlap. The techniques can be used to compute location of the user device for outdoor as well as indoor environments.

For indoor environments, such as offices, business organizations, industries, location computation is performed by utilizing multiple access points that are distributed across an indoor premise. In such places, location of the user device may be computed to track employees for one or more purpose such as, providing location based services to the employees.

SUMMARY

Embodiments of the present disclosure present technological improvements as solutions to one or more of the above-mentioned technical problems recognized by the inventors in conventional systems. For example, in one embodiment, method for determining location of a user device within a premise is provided. The method comprises, identifying a plurality of zones with physical boundaries within the premise based on parameters associated with geometry of the premise. In an embodiment the premise includes a plurality of access points distributed across the plurality of zones. The method further comprises collecting a first set of Received Signal Strength Indicator (RSSI) Data for each zone from amongst the plurality of zones, at different locations within each zone. In an aspect RSSI data is representative of strength of signals received from accessible access points within a zone. Further in another aspect distance of each accessible access point from each location from amongst the different locations is predetermined; and computing a Variable Path Loss Exponent (VPLE) for each accessible access point within each zone based on the first set of RSSI data, a line of sight condition, a non-line of sight condition, and the distance of each accessible access point from each location for determining location of the user device.

In another embodiment, a location detection system for determining location of a user device within a premise is disclosed, the location detection system comprising; a processor, a zone prediction module coupled to the processor. In an aspect the zone prediction module is to identify a zone from amongst a plurality of zones within the premise in which the user device is located. In an aspect each zone includes a physical boundary; and a data collection module coupled to the processor. In another aspect the data collection module is to collect a second set of Received Signal Strength Indicator (RSSI) data, at the location of the user device, from each accessible access point from amongst a plurality of access points accessible within the zone. In yet another aspect the RSSI data is representative of strength of signals received from each accessible access point within the zone; and a location module coupled to the data collection module. In one embodiment the location module is to compute distance of the user device from each accessible access point based on Variable Path Loss Exponent (VPLE) associated with each accessible access point accessible within the zone and the second set of RSSI data; and compute location coordinates of the user device based on the computed distances. Further according to an another aspect the location coordinates are computed by utilizing a trilateration technique, wherein the trilateration technique utilizes the computed distances of the user device from at least three access points from amongst the plurality of access points to determine the location coordinates of the user device.

In yet another embodiment the application provides a non-transitory computer-readable medium comprising instructions for determining location of a user device within a premise, executable by a processor resource to identify a plurality of zones with physical boundaries within the premise based on parameters associated with geometry of the premise, wherein the premise includes a plurality of access points distributed across the plurality of zones; collect a first set of Received Signal Strength Indicator (RSSI) Data at different locations within the premise, wherein the first set of RSSI data represents strength of signals received from each accessible access point within the premise, and wherein distance of each accessible access point from each location from amongst the different locations is predetermined; compute a Variable Path Loss Exponent (VPLE) within each zone for each accessible access point for determining location of the user device, wherein the VPLE for each zone is computed based on the first set of RSSI data, line of sight condition, a non-line of sight condition and the distance of each accessible access point from each location.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Techniques for determining location of a user device are described. Conventionally, various techniques of indoor localization, for determining user location in an indoor environment, have been developed. One such technique leverages a trilateration or finger printing method to determine location of the user device. The technique utilizes past data, such as signals received at different locations and distance of the user device from three or more access points to determine location of the user device. The technique includes a training phase where a system is trained for an extended period of time before determining location of the user device.

Generally, the training phase includes collecting datapoints related to location of the user device at different instances, and signals received during the instances at different locations. For example, the datapoints can be, an employee sitting in a conference room at first floor of a building at a location A, a user device of the employee receiving signals of strength −85 dBm and −90 dBm from two access points that are accessible in the conference room, and the user device at a distance of 15 meters and 17 meters from the two access points, in respective order. In some scenarios, the technique may collect the datapoints associated with the distance from a data store that stores information about different zones within a premise and their respective distances from one or more accessible access points.

Thereafter, a database model is generated during the training phase based on the collected data. The generated database model stores all the datapoints collected at different instances in a structured format. A relationship between the datapoints is then derived based on the generated database model. In the said example, the derived relationship between the datapoints can be, reception of signals with strength −85 dBm or less at the location A within the conference room. The accuracy of the relationship may be improved over time as more datapoints are collected. The relationship is then used to determine the location of the user device when one or more datapoints are predetermined. Thus, a substantial amount of time is needed to collect the datapoints and to derive the relationship between the datapoints. Therefore, such a technique is time consuming, where a substantial amount of time and effort is required before the system starts determining location of the user device. Also, a dedicated infrastructure may be required to incorporate the training phase that leads to increased deployment cost. Therefore, installing such a system may be economically unviable for an organization.

In a large indoor environment, where there are multiple obstructions, signals received and transmitted from the user device experience substantial losses in signal strength during propagation. Therefore, such a technique is observed to provide inaccurate results in a large indoor environment that includes complicated indoor settings with multiple obstructions such as, rooms, cabins and walls. The losses cause inconsistencies in the magnitude of signals received at the different locations and cause faulty location determination. Further, the technique utilizes a propagation model for computing distance of the user device from the access points based on the strength of signals received at the location of the user device. The propagation model uses fixed value of pathloss constant for computing the distance. The fixed value of path loss constant leads to inaccurate results of location determination for indoor environments where the settings are dynamic in nature such as, different materials used for different furniture, different cabinets, and walls within the premise, and moving or sliding doors within the premise.

In accordance with an example implementation of the present subject matter, techniques for determining location of a user device are described. The described techniques are time efficient as they prevent extensive collection of datapoints and deriving relationship during the training phase of the system. Further, the described techniques are cost efficient as they prevent deployment of any additional infrastructure for the training phase. In addition, the described techniques provide a higher degree of accuracy in determining location of the user in a large indoor environment with multiple obstructions.

In an implementation of the present subject matter, a method for determining location of a user device within a premise is described. The method includes identifying multiple zones with physical boundaries within the premise based on parameters associated with geometry of the premise. The premise may include multiple access points distributed across the multiple zones. The method may thereafter include collecting a first set of Received Signal Strength Indicator (RSSI) Data at different locations within the premise. The RSSI data is representative of strength of signals received from each accessible access point within the premise that are accessible within a zone.

In a scenario, the different locations may be selected based on a predetermined resolution from corresponding physical boundaries and the parameters associated with geometry of the premise. The RSSI data is representative of strength of signals received from each accessible access point within the premise that are accessible within a zone. In an implementation, distance of each location from each accessible access point within the zone may be predetermined. That is, the distance between each of the location and the accessible access points may be known. For example, three locations $A_1$, $A_2$, and $A_3$ are selected within a zone based on a predefined resolution of 5 meters from a common physical boundary, and two access points $AP_1$ and $AP_2$ are accessible within the zone. In the said example, the distances of 12 m, 10 m and 15 m for the access point $AP_1$ from each location $A_1$, $A_2$, and $A_3$ may be known. Similarly, distances of 9 m, 5 m and 7 m for the access point $AP_2$ from each location $A_1$, $A_2$, and $A_3$ may also be known. In another implementation, the distance may be computed based on the predetermined resolution and the parameters associated with geometry of the premise.

In an implementation of the present subject matter, after collecting the first set of RSSI data, a Variable Path Loss Exponent (VPLE) is computed for each accessible access point within each zone for determining location of the user device. In an example implementation, a regression technique may be used to compute the VPLE. The VPLE for each zone is computed based on the first set of RSSI data, a line of sight condition, and a non-line of sight condition and the distance of each accessible access point from each location.

Techniques of the present subject matter provide a scalable method of determining location of the user device within the premise by computing VPLE within each zone for each accessible access point. The VPLE is computed based on dynamic indoor conditions such as changing number of obstructions, material of obstruction and thickness of such obstructions. Therefore, the location so determined is accurate for any indoor environment, such as, small, medium or large. Further, the described techniques prevent the extensive training phase of collecting large number of datapoints and deriving relationship between the datapoints thereby saving time and additional deployment costs.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and implementations of the invention, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the words "connected" and "coupled" are used throughout for clarity of the description and can include either a direct connection or an indirect connection. Thus, if a first device couples to a second device, that connection may be through a direct electrical or mechanical connection, through an indirect electrical or mechanical connection via other devices and connections, through an optical electrical connection, or through a wireless electrical connection. Various implementations of the present subject matter have been described below by referring to several examples.

The above mentioned methods and systems are further described with reference to FIG. 1 to FIG. 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

Figure 1:
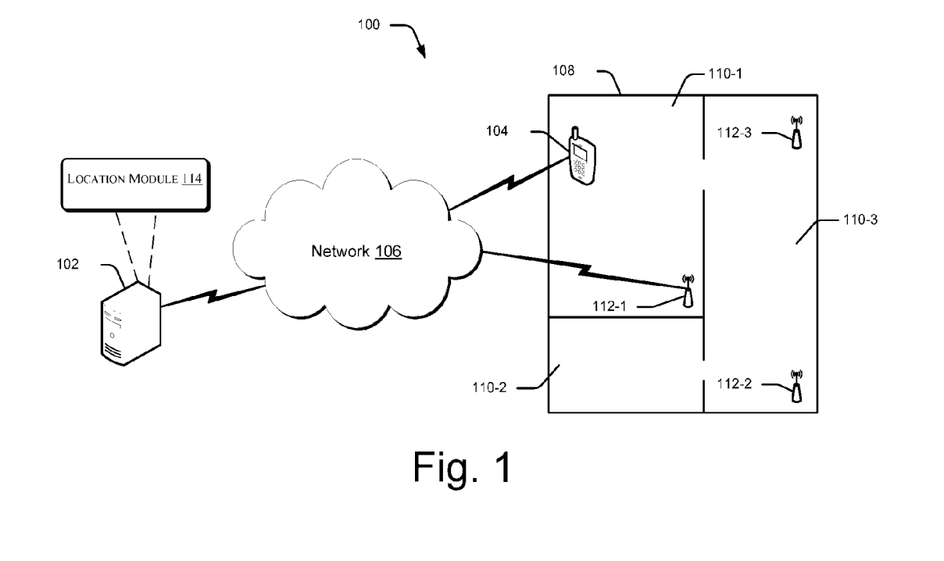
FIG. 1 illustrates an environment, implementing a location detection system, according to an implementation of the present subject matter.

FIG. 1 illustrates an environment 100 according to an implementation of the present subject matter. The environment 100 may either be a public distributed environment or may be a private closed network environment. The environment 100 may include a location detection system 102 communicatively coupled to a user device 104 through a network 106. The user device 104 may be located within a premise 108 that includes multiple zones 110-1, 110-2, . . . 110-n that are separated by physical boundaries. Further, the premise 108 may include multiple access points 112-1, 112-2, . . . , 112-n, collectively referred to as access points 112-n and individually referred to as access point 112, distributed across the multiple zones for receiving and transmitting wireless signals. For ease of explanation, three access points 112-1, 112-2 and 112-3 from amongst the multiple access points 112-n that are located in respective zones 110-1, 110-2, and 110-3 have been illustrated. It would be understood that the access points 112-1, 112-2, 112-3 are communicatively coupled to the location detection system 102 through the network 106. Further, the location detection system 102 includes a location module 114 for determining location coordinates of the user device 104.

In an implementation of the present subject matter, the location detection system 102 may be one of a server, and a computing device that is located outside the premise 108 to compute location coordinates of the user device 104 within the premise 108. In an implementation, the location detection system 102 may be located within the premise 108 to determine location of the user device 104. In another implementation, the location detection system 102 may be a centrally located unit for determining location of one or more user devices located in one or more premises.

Among other capabilities, the user device 104 may be a portable device that is capable of transmitting and receiving wireless signals from the location detection system 102. Examples of the user device 104 includes, personal digital assistants, smart phones, hand held devices, mobile phones, laptops and the like.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as transceivers, gateways, and routers; however, such details have been omitted for ease of understanding. In an implementation, the premise 108 is an office premise with three rooms as three zones, 110-1, 110-2 and 110-3. The zones are separated by physical boundaries as shown in the FIG. 1.

In an implementation of the present subject matter, the location detection system 102 may determine location of the user device 104, within the premise 108, based on various parameters. The parameters may include signals received at the location of user device 104 from each access point 112, path loss associated with each access point 112, and distance of the user device 104 from each access point 112. As shown in FIG. 1, the user device 104 is located in the zone 110-1, the access point 112-1 is located within the same zone 110-1 whereas, the access points 112-2 and 112-3 are located in zones 110-2 and 110-3 in respective order.

The user device 104 may receive the signals from the access points 112-1, 112-2 and 112-3. However, the strength of signals received by the user device 104 from the access points 112-1, 112-2, and 112-3 may vary based on distance of the user device 104 from the access points. For instance, the strength of signals received from the access point 112-1 may be high as access point 112-1 is located in vicinity of the user device 104 and within the same zone 110-1. Also, the strength of signals received from the access points 112-2 and 112-3 may be lower than that of the signals received from the access point 112-1 as the access points 112-2 and 112-3 are located at a distance from the user device 104 and are located in the other zones 110-2 and 110-3 that are separated by physical boundaries. Accordingly, one or more access points that are accessible within a zone with substantial strength of signals may be termed accessible access points hereinafter. To measure the signals, a location detection data indicative of strength of signals, for instance −85 dBm, may be recorded at the location of the user device 104.

In an implementation of the present subject matter, the location detection system 102 may record the location detection data at the location of the user device 104. Thereafter, the location detection system 102 may determine the zone in which the user device 104 is located based on the location detection data. For example, the location detection system 102 may identify the zone 110-1 in which the user device 104 is located based on the location detection data −85 dBm. In another implementation, the user device 104 may record the location detection data and determine the zone in which it is located. Thereafter, the user device 104 may provide the information related to the identified zone to the location detection system 102.

Upon identifying the zone, the information related to the identified zone and the location detection data may be provided to the location module 114. In the said example, the information of zone 110-1 and the location detection data −85 dBm is provided to the location module 114. The location module 114 can be understood as a module for computing location coordinates using a model or a relationship between strength of signals and distance. In addition to the information related to the identified zone and the location detection data, a variable path loss information associated with each access point 112 may also be provided to the location module 114. In an implementation, the variable path losses may be computed based on attenuation of the signals due to dynamic nature of the indoor environment, such as, changing number of obstructions, walls, different materials and thickness of obstructions, different types of furniture and doors within the premise.

Thereafter, the location module 114 may compute distance of the user device 104 from each accessible access point 112 based on the information related to the identified zone, the location detection data, and the variable path loss information. The location module 114 may then compute the location of the user device 104 based on the distance. The explanation regarding functioning of the location detection system 102 and computation of the location have been further explained in detail with respect to the description of forthcoming figures.

Figure 2:
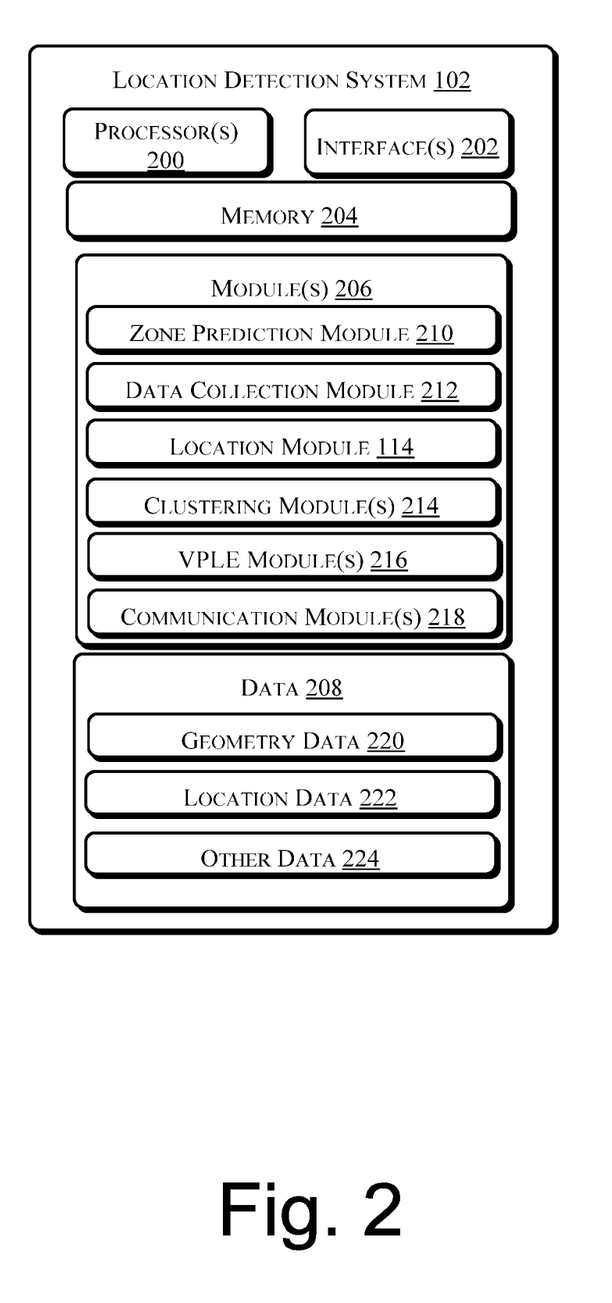
FIG. 2 illustrates components of the location detection system, in accordance with an implementation of the present subject matter.

FIG. 2 illustrates components of the location detection system 102, in accordance with an implementation of the present subject matter. The location detection system 102 may include a processor(s) 200, an interface(s) 202, and a memory 204. Further, the location detection system 102 may include module(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software.

When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the location detection system 102 to interact with different entities, such as the processor 200, the module 206, and the data 208. Further, the interface(s) 202 may enable the components of the location detection system 102 to communicate with other location detection systems, and external repositories. The interface 202 may facilitate multiple communications within a wide variety of networks and protocol types, including wireless networks, wireless Local Area Network (WLAN), RAN, satellite-based network, etc.

The memory 204 may be coupled to the processor 200 and may, among other capabilities, provide data and instructions for generating different requests. The memory 204 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement particular abstract data types. The module(s) 206 may further include modules that supplement applications on the location detection system 102, for example, modules of an operating system. Further, the module 206 can be implemented in hardware, instructions executed by a processing unit, or by a combination thereof.

In another aspect of the present subject matter, the module(s) 206 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The data 208 serves, amongst other things, as a repository for storing data that may be fetched, processed, received, or generated by one or more of the module(s) 206.

The module(s) 206 may perform different functionalities which may include, but may not be limited to, determining a zone in which the user device 104 is located, collecting data related to signal strength at different locations, computing location coordinates for the user device 104. Further, the module(s) 206 may perform clustering of the data, and computing Variable Path Loss Exponent (VPLE). Accordingly, the module(s) 208 may include a zone prediction module 210, a data collection module 212, a location module 214, a clustering module 216, a VPLE module 218, and a communication module 220. The data 208 may include a geometry data 220, a location data 222 and other data 224 such as a database or a knowledge model.

For ease of explanation, the process of determining location of the user device 104 and functioning of components of the location detection system 102 have been described in two phases, a calibration phase and a location determination phase. During the calibration phase, the zone prediction module 210 may identify the multiple zones 110 within the premise 108 based on the geometry data 220 and the location data 222. The geometry data 220 may include details about a floor plan of the premise 108, such as, area of the premise 108, multiple zones 110 and their boundaries. The location data 222 may include location details and distance of each access point 112 from each zone within the premise 108.

Thereafter, the data collection module 212 may formulate the location detection data related to strength of signals, for instance Wi-Fi signals, in terms of Received Signal Strength Indicator (RSSI) data at different locations within the premise 108. In an implementation, the different locations can be different synthetic points that are selected based on a predefined resolution within the boundaries of each zone and parameters associated with geometry of the premise. In another implementation, distance of each accessible access point from each location from amongst the different locations is predetermined. That is, the distance between each of the location and the accessible access points may be known.

In another implementation, the distance of each accessible access point from each location may be determined based on the location data 222 that is already available with the location detection system 102. Thereafter, the data collection module 212 may convert the distance into a corresponding RSSI data. In an example implementation, the data collection module 212 may convert the distance into the corresponding RSSI data using the equation, $$d = e^{\frac{(P_d - A)}{10n}}, \quad (1)$$

where, $P_d$=RSSI at distance d, A=RSSI at one meter, n is path loss exponent. Here, n is calculated empirically for all access points 112 with line of sight and non-line of sight condition. In an implementation, the non-line of sight condition is associated with one of, material of obstructions within the premise, thickness of the material, and an attenuation factor of the obstruction.

After formulating the RSSI data, the data collection module 212 may then collate the RSSI data in the database. The database may also be refined over time based on RSSI data collected in real time from several user devices to obtain a first set of RSSI data that is based on real time conditions.

Thereafter, the VPLE module 216 may compute a Variable Path Loss Exponent (VPLE) within each zone for each accessible access point 112. The VPLE for each zone may be computed based on one of a first set of RSSI data, a line of sight condition, and a non-line of sight condition and the distance of each accessible point from each location. For instance, the VPLE module 216 computes a value $V_1$ for VPLE of the access point 112-1 in the zone 110-1, a value of $V_2$ for VPLE of the access point 112-2 in the zone 110-1 and $V_3$ for VPLE of the access point 112-3 in the zone 110-1. Similarly, the VPLE module 216 may compute the values of VPLEs for each access point in the zones 110-2 and 110-3. In an implementation, the VPLE is computed based on path loss exponents that are computed at each location from amongst the different locations based on the first set of RSSI data collected at each location and the distance of each accessible access point from each location. Thereafter, a regression technique, for instance, a linear regression technique, may be applied to the computed path loss exponents to obtain the VPLE.

For example, the values 2.5, 3.5, and 3 may be values of path loss exponents computed for the access point 112-1 at the different locations within the zone 110-1. Thereafter, the linear regression technique may be applied to the path loss exponents to obtain a value of 3 as the value of VPLE for the access point 112-1 within the zone 110-1. In an example implementation, the VPLE module 216 may compute the VPLE based on the equation, $$n_i = -\left(\frac{P_{d_i} - A}{10\log_{10}d_i}\right) \quad (2)$$

where, A is the signal strength received at one meter, and Pdi is the signal strength received at the known distance of di.

The VPLE so computed is sensitive to the dynamic nature of indoor environments, such as, changing number of obstruction, walls, different material and thickness of obstructions, furniture and doors within the premise, and attenuation factors of the obstructions. Therefore, the VPLE provides an accurate estimation of the losses of strength that signals experience during propagation thereby facilitating in accurate location determination. The computation of the VPLE within each zone 110 for each access point 112 by the VPLE module 216 can be understood as completion of the calibration phase. Hence, after completion of the calibration phase, each zone 110 within the premise 108 may be calibrated with respective values of VPLEs for each access point 112.

Thereafter, the VPLE module 216 may provide the VPLE within each zone for each access point to the location module 114. In a scenario, the VPLE computed for each access point within each zone is stored in another database for later use by location module 114 for location determination.

In an implementation of the present subject matter, the zone prediction module 210 may identify the zone of the user device 104 based on known techniques, such as, biometric sensing, access card, Wi-Fi transceivers, and mobile docking stations close to a zone. Thereafter, the zone prediction module 210 may provide the identified zone to the location module 114.

The data collection module 212 may collect a second set of RSSI data at the location of the user device 104 and provide the second set of RSSI data to the location module 114. In an implementation, the user device 104 may collect the second set of RSSI data and provide it to the location module 114 of the location detection system 102.

In an implementation, the location module 114 may receive the information related to the identified zone from the zone prediction module 210, the VPLE from the VPLE module 216, and the second set of RSSI data from the data collection module 212 during the location determination phase. The location module 114 may then determine distance of the user device 104 from each accessible access point based on the information related to the identified zone, the VPLE, and the second set of RSSI data. In an example implementation, the location module 114 may utilize equation (1) to obtain the distance. In the said example implementation, the location module 114 may improve the accuracy of the computed distance based on the equation, $$P_d = P_{d_i} - 10n\log_{10}\left(\frac{d}{d_i}\right) - L_a \qquad (3)$$

where, Pd is the signal strength received at the distance of d, Pdi is the signal strength received at the known distance of di, n is the path loss exponent that is derived based on attenuation model for indoor environment, and $L_a$ is the attenuation factor depends on the building layout and construction material.

After determining the distance of the user device 104 from each accessible access point 112, the location module 114 may compute the location coordinates of the user device 104. The location module 114 may compute the location coordinates based on a trilateriation technique that utilizes the distance of the user device from three or more accessible access points to determine the location coordinates of the user device 104. In an example implementation, the location module 114 may utilize a least square trilateration algorithm to compute the location coordinates. The determination of the location coordinates of the user device 104 can be understood as the completion of the location determination phase. The location coordinates represent exact location of the user device 104 within the identified zone 110-1 and may be one of, values of x-axis and y-axis within the identified zone 110-1, and distance of the user device 104 from each physical boundary of the identified zone 110-1.

In an implementation, the location coordinates may be stored as an entry in the database along with a corresponding time instance and a day. The entry may later be used by the location detection system 102 to predict location coordinates of the user device 104 based on the corresponding time instant and the day.

Figure 3:
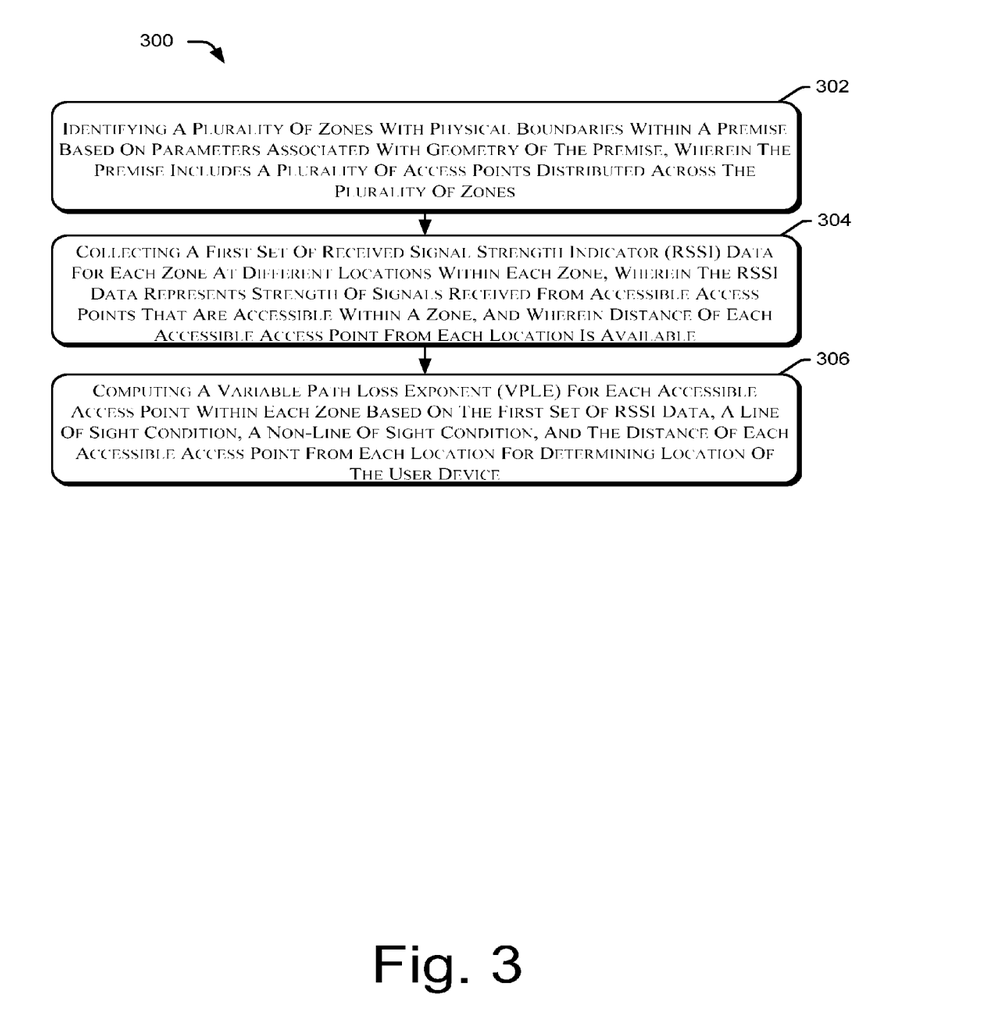
FIG. 3 illustrates a method for calibrating a plurality of zones within a premise, according to an implementation of the present subject matter
Figure 4:
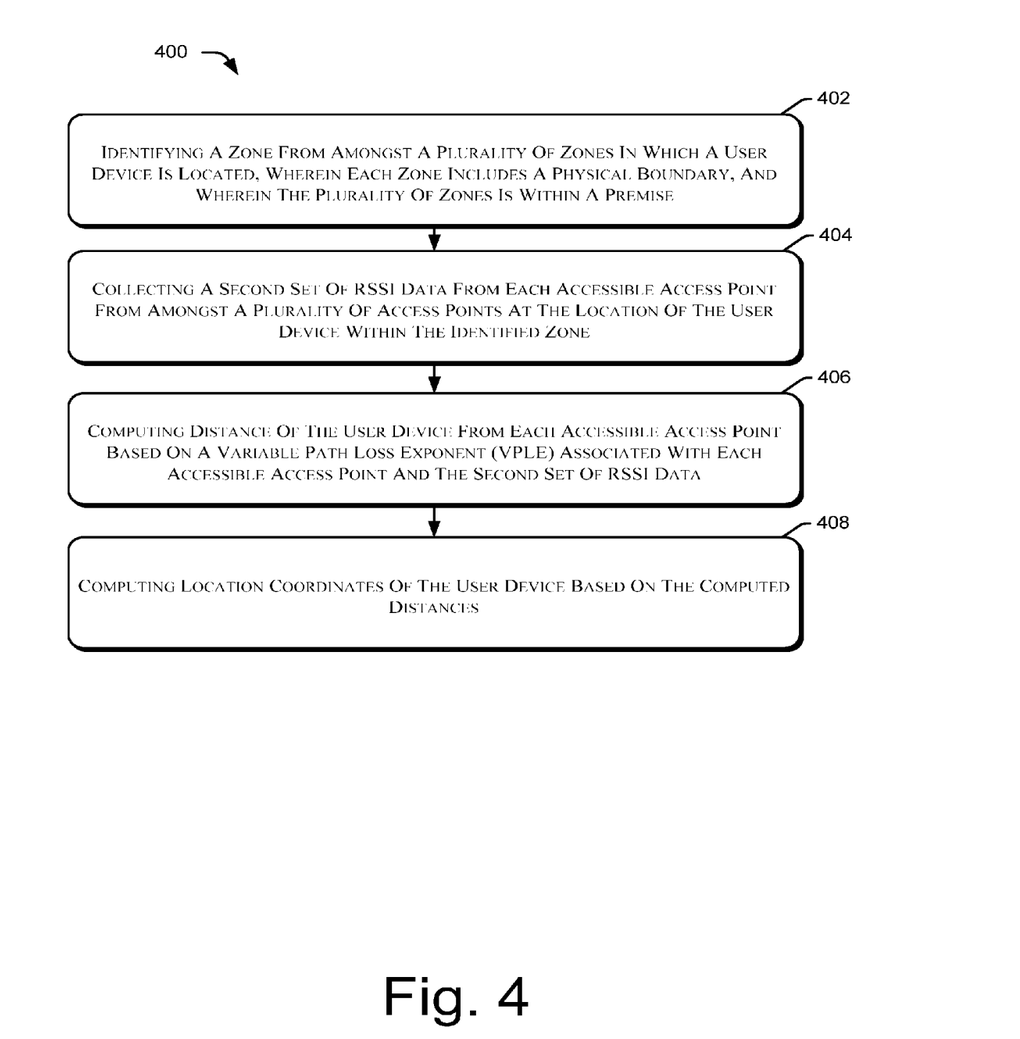
FIG. 4 illustrates a method for determining location of a user device, according to an implementation of the present subject matter.

FIG. 3 and FIG. 4 illustrates method 300 and 400 in accordance according with implementations of the present subject matter. The order in which the methods 300 and 400 are described is not intended to be construed as a limitation, and any number of the described method blocks may be combined in any order to implement the methods 300 and 400 or an alternative method. Furthermore, the methods 300 and 400 may be implemented by processor(s) or computing system(s) through any suitable hardware, non-transitory machine readable instructions, or combination thereof.

It may be understood that steps of the methods 300 and 400 may be performed by programmed computing systems. The steps of the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. In an implementation of the present subject matter, the methods 300 and 400 may be executed by the location detection system 102, as described earlier.

FIG. 3 illustrates a method for calibrating multiple zones within a premise, according to an implementation of the present subject matter. At block 302, multiple zones with physical boundaries may be identified within a premise based on parameters associated with geometry of the premise. The premise includes multiple access points distributed across the multiple zones. In an implementation, the zone prediction module 210 may identify the multiple zones within the premise 108 based on the geometry data 220.

At block 304, a first set of Received Signal Strength Indicator (RSSI) data may be collected at different locations within the premise. The RSSI data represents strength of signals received from each accessible access point in the premise. In an implementation, the data collection module 212 may collect the first set of RSSI data at the different locations within the premise 108. Distance of each accessible access point from each location from amongst the different locations is predetermined At block 306, a Variable Path Loss Exponent (VPLE) is computed within each zone for each accessible access point. The VPLE may be computed based on the first set of RSSI data, a line of sight condition and a non-line of sight condition and the distance of each accessible access point from each location. The line of sight condition can be understood as signals that are received by the user device without any obstruction and the non-line of sight condition as a condition when the signals are received through the obstructions. In an implementation of the present subject matter, the VPLE module 216 of the location detection system 102 may compute the VPLE based on the line of sight condition and the non-line of sight condition.

FIG. 4 illustrates a method for determining location of a user device, according to an implementation of the present subject matter. At block 402, a zone may be identified from amongst the multiple zones within the premise where the user device is located. In an implementation, the zone prediction module 210 may identify the zone 110-1 in which the user device 104 is located. After identifying the zone, a second set of RSSI data may be collected from each accessible access point at the location of the user device at block 404. In an implementation, the data collection module 212 may collect the second set of RSSI data at the location of the user device 104.

Thereafter, at block 406, distance of the user device from each accessible access point may be computed based on the identified zone, the VPLE associated with each access point, and the second set of RSSI data received from each accessible access point. In an implementation of the present subject matter, the distance is computed by the location module 114 based on the identified zone, the VPLE, and the second set of RSSI data.

After computing the distance of the user device, location coordinates of the user device may be computed based on the computed distances at block 408. In an implementation, the location module 114 may compute the location coordinates using the computed distances.

Thus, the described method and system provide a higher degree of accuracy in computing location of the user device by utilizing dynamic nature of the obstructions within a premise and corresponding attenuation in strength of signals for computing the location. Further, the described method and system are time-efficient and prevent any dedicated infrastructure to be deployed thereby avoiding additional deployment costs.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining location of a user device within a premise, the method comprising:
   identifying a plurality of zones with physical boundaries within the premise based on parameters associated with geometry of the premise, wherein the premise includes a plurality of access points distributed across the plurality of zones;
   collecting a first set of Received Signal Strength Indicator (RSSI) Data for each zone from amongst the plurality of zones, at different locations within each zone, wherein RSSI data is representative of strength of signals received from accessible access points within a zone, and wherein distance of each accessible access point from each location from amongst the different locations within the zone is predetermined; and
   computing a Variable Path Loss Exponent (VPLE) for each accessible access point within each zone based on the first set of RSSI data, a line of sight condition, a non-line of sight condition, and the distance of each accessible access point from each location for determining location of the user device.

2. The method according to claim 1 further comprising:
   identifying a zone from amongst the plurality of zones in which the user device is located, wherein each zone includes a physical boundary;
   collecting a second set of RSSI data, received from each accessible access point accessible within the zone, at the location of the user device within the identified zone;
   computing distance of the user device from each accessible access point based on a Variable Path Loss Exponent (VPLE) associated with each accessible access point accessible within the zone and the second set of RSSI data; and
   computing location coordinates of the user device based on the computed distance, wherein the location coordinates are computed by utilizing a trilateration technique, wherein the trilateration technique utilizes the computed distances of the user device from at least three accessible access points from amongst the plurality of access points to determine the location coordinates of the user device.

3. The method according to claim 1, wherein computing the VPLE comprises:
   computing path loss exponents at each location from amongst the different locations based on the first set of RSSI data collected at each location and the distance of each accessible access point from each location; and
   applying a regression technique to the computed path loss exponents for computing the VPLE.

4. The method according to claim 1, wherein the geometry of the premise includes data associated with at least one of area of the premise and boundary of each zone.

5. The method according to claim 1, wherein the non-line of sight condition is associated with at least one of material of obstructions within the premise, thickness of the material, and an attenuation factor of the obstruction.

6. The method according to claim 1, wherein the accessible access points have substantial strength of signals compared to the strength of signals of other access points in the plurality of access points.

7. A location detection system for determining location of a user device within a premise, the location detection system comprising:
   a processor;
   a zone prediction module coupled to the processor, wherein the zone prediction module is to identify a zone from amongst a plurality of zones within the premise in which the user device is located, wherein each zone includes a physical boundary; and
   a data collection module coupled to the processor, wherein the data collection module is to collect a second set of Received Signal Strength Indicator (RSSI) data, at the location of the user device, from each accessible access point from amongst a plurality of access points accessible within the zone, wherein the RSSI data is representative of strength of signals received from each accessible access point within the zone; and
   a location module coupled to the data collection module, wherein the location module is to:
      compute distance of the user device from each accessible access point based on Variable Path Loss Exponent (VPLE) associated with each accessible access point accessible within the zone and the second set of RSSI data; and
      compute location coordinates of the user device based on the computed distances, wherein the location coordinates are computed by utilizing a trilateration technique, wherein the trilateration technique utilizes the computed distances of the user device from at least three access points from amongst the plurality of access points to determine the location coordinates of the user device.

8. The location detection system according to claim 7, wherein:
the prediction module identifies the plurality of zones with physical boundaries within the premise based on parameters associated with geometry of the premise, wherein the premise includes the plurality of access points distributed across the plurality of zones;
the data collection module collects a first set of RSSI data at different locations within the premise, wherein distance of each accessible access point from each location from amongst the different locations is predetermined; and
a VPLE module computes the VPLE for each access point within each zone based on the first set of RSSI data, a line of sight condition, a non-line of sight condition, and the distance of each accessible access point from each location for determining location of the user device.

9. The location detection system according to claim 8, wherein the non-line of sight condition corresponds to, material of an obstruction within the premise, thickness of the material, and an attenuation factor of the obstruction.

10. The location detection system according to claim 7, wherein the accessible access points have substantial strength of signals compared to the strength of signals of other access points in the plurality of access points.

11. A non-transitory computer-readable medium comprising instructions for determining location of a user device within a premise, executable by a processor resource to:
identify a plurality of zones with physical boundaries within the premise based on parameters associated with geometry of the premise, wherein the premise includes a plurality of access points distributed across the plurality of zones;
collect a first set of Received Signal Strength Indicator (RSSI) Data at different locations within each zone, wherein the first set of RSSI data represents strength of signals received from each accessible access point within the premise, and wherein distance of each accessible access point from each location from amongst the different locations within a zone amongst the plurality of zones is predetermined;
compute a Variable Path Loss Exponent (VPLE) within each zone for each accessible access point for determining location of the user device, wherein the VPLE for each zone is computed based on the first set of RSSI data, line of sight condition, a non-line of sight condition and the distance of each accessible access point from each location.

12. The non-transitory computer-readable medium according to claim 11, wherein the instructions for determining location are further to:
identify a zone from amongst the plurality of zones in which the user device is located, wherein each zone includes a physical boundary, and wherein the plurality of zones is within the premise;
collect a second set of RSSI data from each accessible access point accessible within the zone, at the location of the user device;
compute distance of the user device from each accessible access point based on a Variable Path Loss Exponent (VPLE) associated with each accessible access point and the second set of RSSI data; and
compute location coordinates of the user device based on the computed distances, wherein the location coordinates are computed by utilizing a trilateration technique, wherein the trilateration technique utilizes the computed distances of the user device from at least three accessible access points from amongst the plurality of access points to determine the location coordinates of the user device.

13. The non-transitory computer-readable medium according to claim 11, wherein the accessible access points have substantial strength of signals compared to the strength of signals of other access points in the plurality of access points.

* * * * *